D. B. SPATZ.
VEHICLE SIGNAL DEVICE.
APPLICATION FILED DEC. 30, 1920.
1,386,906.
Patented Aug. 9, 1921.
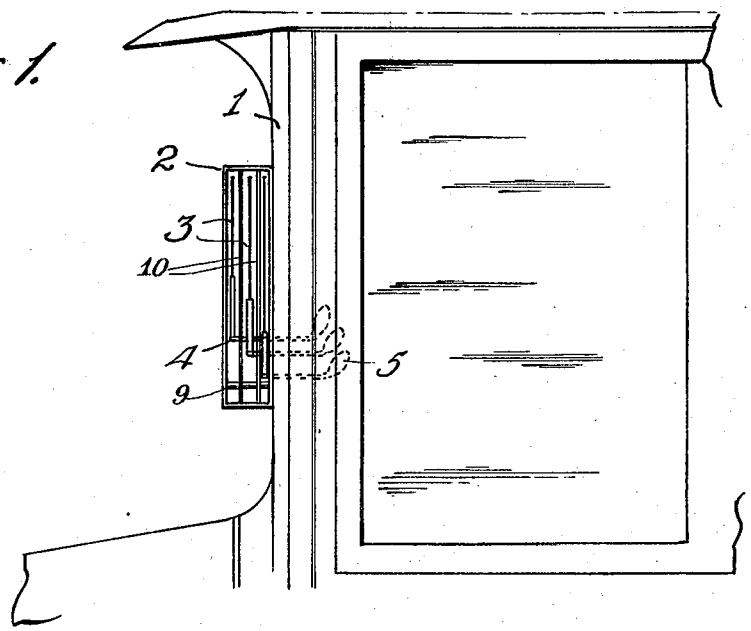
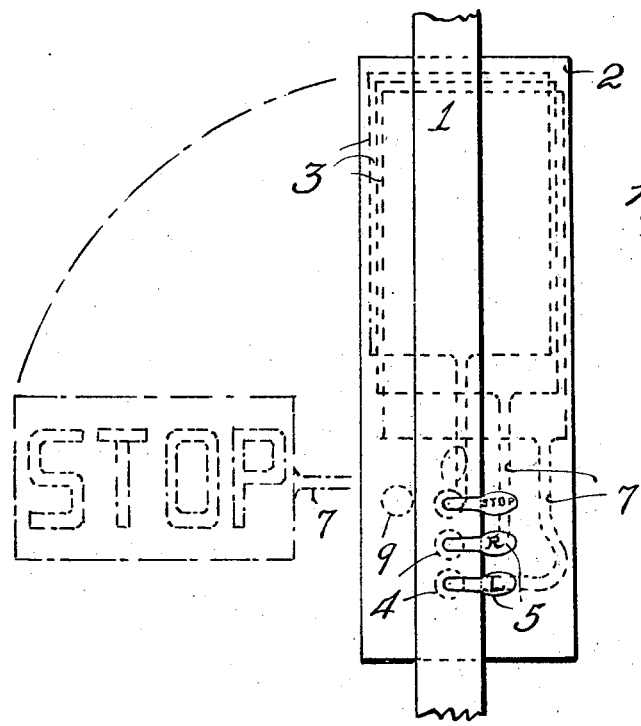
Daniel B. Spatz,
Inventor

UNITED STATES PATENT OFFICE.

DANIEL B. SPATZ, OF READING, PENNSYLVANIA.

VEHICLE SIGNAL DEVICE.

1,386,906.  Specification of Letters Patent.  Patented Aug. 9, 1921.

Application filed December 30, 1920. Serial No. 434,128.

*To all whom it may concern:*

Be it known that I, DANIEL B. SPATZ, a citizen of the United States, residing at Reading, in the county of Berks and State of Pennsylvania, have invented certain new and useful Improvements in Vehicle Signal Devices, of which the following is a specification.

This invention relates to improvements in vehicle signal devices, and the object of the invention is to provide a simple and cheap device capable of being secured to the vehicle, such as an automobile for instance, in a position where it will be within easy reach of the driver.

A further object is to provide a simple and effective device whereby the driver of a vehicle may, with a single and quick movement, display a signal, visible from both front and rear, that will indicate either a stop of the vehicle, or a turn to the right or left.

An object of the invention is also to have the device in such position that the driver can see it at all times, thus preventing accidents due to accidental throwing of the wrong signal.

The invention is more fully described in the following specification, and clearly illustrated in the accompanying drawing, in which:—

Figure 1 is a side elevational view of the forward portion of a vehicle body, with my invention applied thereto.

Fig. 2 is an enlarged view of the device, in rear elevational view, as it appears on the upright of the vehicle.

The numeral 1 designates an upright member of a vehicle, to which I find it most convenient to apply my device, particularly in what is termed a "closed car". The numeral 2 designates a casing or housing, within which the signal arms are normally located.

The numeral 3 designates the signal arms, of which there will preferably be three, one to indicate a stop of the vehicle, one to indicate the intention of the driver to turn to the right, and one to indicate an intention to turn to the left. These arms will each have the word indicating the direction, placed upon each side, so that it will be visible from front and rear.

These arms are mounted in the casing on shafts 4, and each is provided with an operating handle or knob 5, which is attached to the ends of the shafts and within easy reach of the driver. Each signal arm is mounted on a rod 7, and so arranged that when the handle is turned, the signal arm will be thrown to a position approximately at right angles to the upright member to which the device is attached, so that it will assume the position indicated in dotted lines in Fig. 2.

The numeral 9 designates a stop for limiting the movement of the signal arms, and against which the rods 7 will bear when the signal arm is thrown to operative or outward position.

The casing 2 is divided into a plurality of compartments, each separated from its neighbor by a vertical partition 10, and each compartment accommodates one of the signal arms.

This construction will prevent interference of the arms, one with the other, and will insure the prompt and free action required in a device of this character. Any irregularity on the part of any of the arms will be noted promptly when, if for any reason it cannot easily enter its compartment, and it may then be corrected at once.

The operating handles may be provided with symbols or initials indicating which signal is carried thereby, so that the tendency to error on the part of the driver is reduced.

It is evident that the details of construction disclosed in the drawing may easily be varied to suit different vehicles, and that the device may be applied to other than the parts of the vehicle shown in the drawing, as for instance, with slight extensions of the parts, the device may be applied to the rear or other portion of the vehicle.

Having thus described my invention, what I claim and desire to secure by Letters Patent is:—

In a device of the character described, the combination of a vehicle upright member, with a vertical, open-sided signal arm casing secured thereto, said casing being provided with a plurality of vertical partitions, forming separate compartments within the casing; a plurality of signal arms normally held in vertical position each in one of the said compartments and mounted for arcuate movement, rods attached to the arms and shafts to which the arms are attached; an operating handle on each shaft and a stop member adapted for contact by said rods, whereby the movement of the signal arms is stopped when they attain a horizontal position relatively to the vertical housing, all substantially as and for the purpose set forth.

In testimony whereof I affix my signature.

DANIEL B. SPATZ.